May 2, 1961 W. E. WORLEY 2,982,497
CLAMP RING RELEASE MECHANISM FOR AIRCRAFT BOOSTER
Filed March 28, 1958
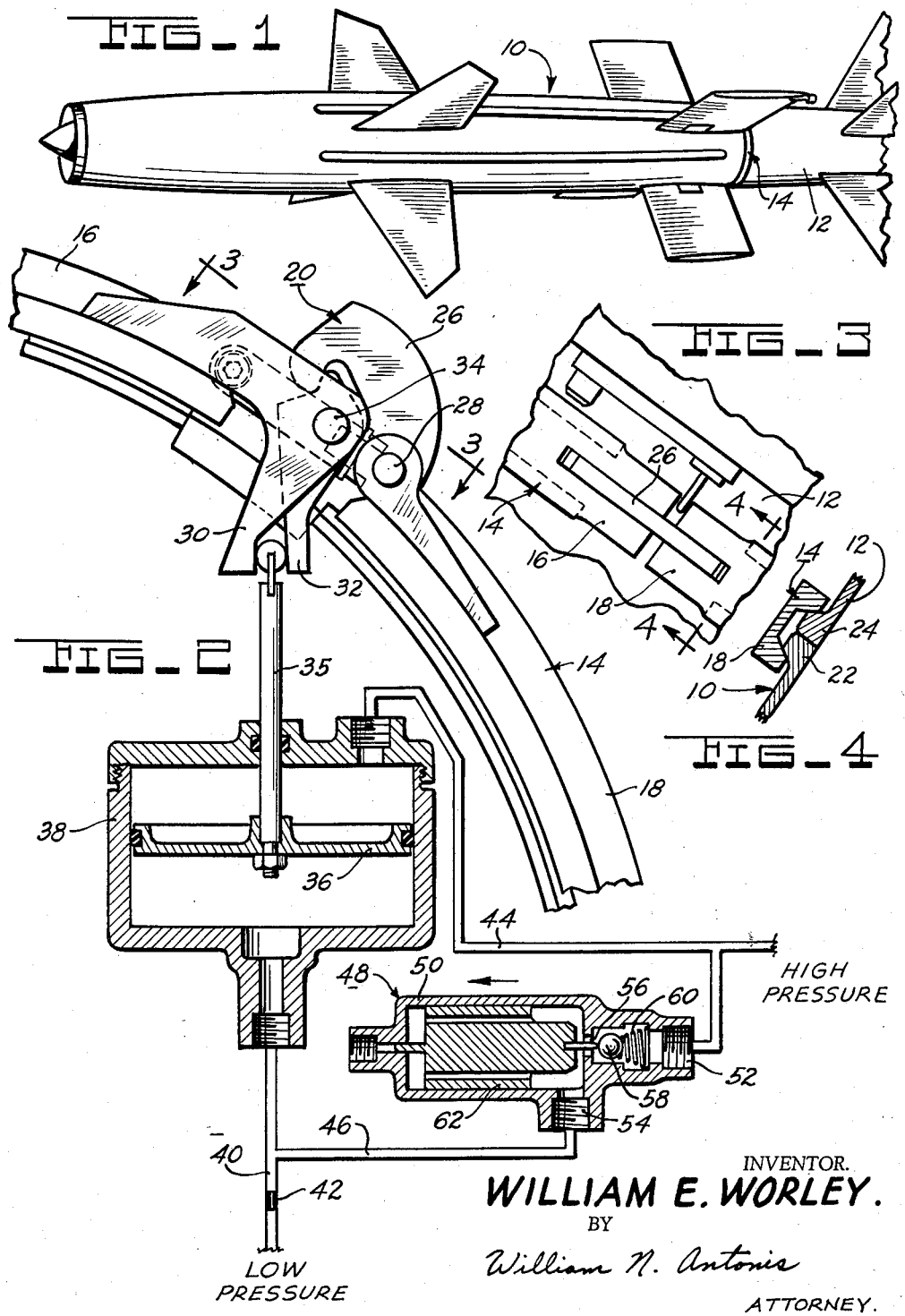
INVENTOR.
WILLIAM E. WORLEY.
BY
William N. Antonis
ATTORNEY.

United States Patent Office 2,982,497
Patented May 2, 1961

2,982,497

CLAMP RING RELEASE MECHANISM FOR AIRCRAFT BOOSTER

William E. Worley, Mishawaka, Ind., assignor to The Bendix Corporation, a corporation of Delaware Filed Mar. 28, 1958, Ser. No. 724,729

6 Claims. (Cl. 244—54)

This invention relates to release mechanisms and more particularly to an actuating mechanism for releasing a booster from a missile or other aircraft during flight.

In the past various systems for releasing boosters have been utilized, which often failed to function as desired. Some of these systems incorporated such items as sealed nitrogen bottles with perforation diaphragms, multiple area actuator pistons, and used booster gas in the operation thereof. Since activation of such release mechanisms is desired at the time the aircraft and booster pass through zero acceleration at the end of boost time, it was felt that an acceleration sensitive device would be more appropriate to instigate unlatch time rather than some form of pressure input. Also, it was felt that the use of diffuser pressure and static pressure (relatively cold clean air) as a power source would be more direct and less hazardous.

It is therefore, an object of this invention to provide a simple, direct, less hazardous release mechanism for releasing a booster from an aircraft during flight, which will operate automatically at the desired time.

Another object of this invention is to provide a release mechanism which utilizes an acceleration sensitive device to initiate the releasing sequence at the time the aircraft and booster pass through a given acceleration at the end of boost time.

A further object of this invention is to provide pressure responsive means for releasing a booster from an aircraft wherein the pressures on said pressure responsive means are controlled by "g" sensitive (acceleration sensitive) valve means.

A still further object of this invention is to provide means for releasing a booster from an aircraft wherein diffuser pressure and static pressure may be used as the power source.

The above and other objects and features of the invention will be apparent from the following description of the device taken in connection with the accompanying drawing which forms a part of this specification and in which:

Figure 1 is a pictorial view of a missile with a booster attached thereto;

Figure 2 is a schematic view partially in section showing my clamp ring release mechanism;

Figure 3 is a sectional view taken substantially along line 3—3 of Figure 2; and Figure 4 is a sectional view taken along line 4—4 of Figure 3.

Referring to the drawing it will be noted that numeral 10 designates a missile to which is attached a booster 12, said booster being attached to said missile by suitable means such as clamp ring 14. The clamp ring is formed of two arcuate parts 16 and 18 suitably hinged together so as to permit the opening of said clamp ring and includes a latch mechanism 20 which prevents the opening of the clamp ring. The clamp ring 14 has a U-shaped section and holds the booster 12 to the missile 10 by grasping the flanges 22 and 24 formed on the ends thereof as shown in Figure 4. The latch mechanism shown includes a hook type latch 26 which is connected to part 18 of clamp ring 14, said latch 26 being hinged at 28 to permit pivotal movement thereabout, and locking means consisting of a first member 30 rigidly connected to the other part 16 of clamp ring 14 and a second member 32 pivotally connected to member 30 at point 34, said member 32 having a first position which prevents movement of the latch 26 and a second or released position which permits the latch to move freely. Once the clamping latch is in a released position, the forces acting thereon during flight will cause the clamp and booster to fall away from the aircraft in question. The particular configuration of the latch mechanism shown is only by way of example, it being obvious that other latch mechanisms could also be used.

An actuating rod 35 is interposed between members 30 and 32 of the latch mechanism to prevent member 32 from moving to a released position, said actuating rod 35 being connected to a piston 36 which is slidable in power cylinder 38. The power cylinder is suitably attached to booster 12. The large area side of piston 36 is connected to a low pressure source such as static pressure via conduit 40 having a restriction 42 therein, while the small area side of piston 36 is connected to a high pressure source such as ram or diffuser pressure via conduit 44. The large area side of piston 36 is also connected to the high pressure source via conduit 46, but flow through this conduit is controlled by a "g" sensitive (acceleration sensitive) valve 48. The "g" valve includes a housing 50 having an inlet port 52 and an outlet port 54, a valve seat 56 located between said ports, a ball valve 58 seatable on valve seat 56, a spring 60 which urges the ball valve 58 toward the valve seat, and a weight 62 slidable within the valve housing for moving the ball valve off its associated valve seat.

Operation of the clamp release mechanism is as follows: During the boost phase both sides of piston 36 are subjected to high pressure since the "g" valve 48, which is moving in the direction shown by the arrow, will be in an open position. The valve will remain in this open position as long as the acceleration forces acting on slidable weight 62 are great enough to maintain ball valve 58 in an unseated position against the force of spring 60 which is urging the ball valve toward valve seat 56. With equal or near equal pressures acting on piston 36 the piston will be urged in an upward direction to maintain the end of actuating rod 35 between the latch locking members 30 and 32. During reduction of booster power at the end of the boost phase the "g" sensitive valve 48 will close at a predetermined acceleration value, since the acceleration forces acting on weight 62 will not be sufficient to overcome the force of spring 60, thereby venting the large area side of piston 36 to the low pressure source. Consequently, the differential pressure across the piston 36 will cause it to move downwardly, thus withdrawing the end of actuating rod 35 from between members 30 and 32. The response time for completion of the piston stroke can be controlled by selection of appropriate bleed restrictions, tube sizes, and pressure levels. After the end of rod 35 has been withdrawn from between members 30 and 32, the clamping latch will be in a released position and the forces acting thereon during flight will cause the clamp and booster to fall away from the aircraft.

Although this invention has been described in connection with a specific embodiment, it should be understood that various changes in the form and relative arrangements of the parts may be made to suit requirements and that the principles are susceptible of numerous other applications that will readily occur to persons skilled in the art.

For example, both sides of piston 36 could be connected to a low pressure source, said small area side of piston 36 also being connected to a high pressure source. A "g" valve in the high pressure line would be arranged so that it would be in a closed position during the boost phase and in an open position at the end thereof when the acceleration forces acting thereon have decreased, thus permitting flow from the high pressure source to the small area side of the piston. The differential pressure acting on the piston would cause withdrawal of the rod 35 from between the members 30 and 32 in the same manner as previously described.

Having thus described the various features of the invention, what I claim as new and desire to secure by Letters Patent is:

1. In an aircraft having a booster, means for clamping said booster to said aircraft, pressure responsive means operatively connected to said clamping means for releasing same from said aircraft upon movement thereof, fluid pressure means communicating with said pressure responsive means, valve means for controlling communication between said fluid pressure means and said pressure responsive means to control movement thereof, and means responsive to acceleration forces for producing movement of said valve means, said movement causing said valve means to vary the pressure exerted against said pressure responsive means to induce movement thereof.

2. In an aircraft having a booster, means for clamping said booster to said aircraft, pressure responsive means operatively connected to said clamping means for releasing same from said aircraft, said pressure responsive means having oppositely disposed sides, means for communicating the opposite sides of said pressure responsive means with a first presure source, means for communicating one of said sides of said pressure responsive means with a second pressure source, and valve means for controlling communication between said one side of said pressure responsive means and one of said first and second pressure sources, said valve means being responsive to predetermined acceleration forces acting thereon for providing a differential pressure across said pressure responsive means to release said clamping means from said aircraft.

3. In an aircraft having a booster, means for clamping said booster to said aircraft, means for preventing said clamping means from being released from said aircraft, said second mentioned means having a first position for preventing release of said clamping means and a second position for permitting release of said clamping means, pressure responsive means connected to said second mentioned means, said pressure responsive means having oppositely disposed sides, means communicating the opposite sides of said pressure responsive means with a first pressure source for maintaining said second mentioned means in said first position, means for communicating one of said sides of said pressure responsive means with a second pressure source, and valve means for controlling communication between said one side of said pressure responsive means and one of said first and second pressure sources, said valve means being responsive to predetermined acceleration forces acting thereon for providing a differential pressure across said pressure responsive means to move said second mentioned means to said second position.

4. In an aircraft having a booster, means for clamping said booster to said aircraft, means for preventing said clamping means from being released from said aircraft, said second mentioned means having a first position for preventing release of said clamping means and a second position for permitting release of said clamping means, pressure responsive means connected to said second mentioned means, said pressure responsive means having oppositely disposed sides, means communicating the opposite sides of said pressure responsive means with a high pressure source for maintaining said second mentioned means in said first position, means for communicating one of said sides of said pressure responsive means with a low pressure source, valve means for controlling communication between said one side of said pressure responsive means and said high pressure source, and means responsive to acceleration forces for producing movement of said valve means, said movement cutting off communication between said one side of said pressure responsive means and said high pressure source thereby creating a differential pressure across said pressure responsive means to move said second mentioned means to said second position.

5. In an aircraft having a booster, means for clamping said booster to said aircraft, a latch mechanism connected to said clamping means for preventing the release of said clamping means from said aircraft, said latch mechanism having a restrained position and a released position, means for controlling movement of said latch mechanism from said restrained position to said released position, said last named means comprising a power cylinder, a piston movable in said power cylinder, and a piston rod connected to said piston and to said latch mechanism for permitting movement of said latch mechanism from the restrained position to the released position upon movement of said piston rod away therefrom, means communicating the opposite sides of said piston with a first pressure source for maintaining said piston rod in a position to prevent movement of said latch mechanism to the released position, means for communicating one of said sides of said piston with a second pressure source, valve means for controlling communication between said one side of said piston and one of said first and second pressure sources, means responsive to acceleration forces for producing movement of said valve means, said valve means moving to a position at a predetermined aceeleration force whereby communication between said one side of said piston and one of said first and second pressure sources is varied to create a differential pressure across said piston thereby causing movement of said piston and piston rod away from said latch mechanism to permit movement of said latch mechanism to the released position.

6. In an aircraft having a booster, means for clamping said booster to said aircraft, a latch mechanism connected to said clamping means for preventing the release of said clamping means from said aircraft, said latch mechanism having a restrained position and a released position, means for controlling movement of said latch mechanism from said restrained position to said released position, said last named means comprising a power cylinder, a piston moveable in said power cylinder, and a piston rod connected to said piston and to said latch mechanism for permitting movement of said latch mechanism from the restrained position to the released position upon movement of said piston rod away therefrom, means communicating the opposite sides of said piston with a high pressure source for maintaining said piston rod in a position to prevent movement of said latch mechanism to the released position, means for communicating the large area side of said piston with a low pressure source, valve means for controlling communication between said large area side of said piston and said high pressure source, means responsive to acceleration forces for producing movement of said valve means, said valve means moving to a closed position when no acceleration forces are exerted on said last mentioned means thereby cutting off communication between said large area side of said piston and said high pressure source and causing movement of said piston and piston rod away from said latch mechanism to permit movement of said latch mechanism to the released position.

References Cited in the file of this patent

UNITED STATES PATENTS

| | | |
|---|---|---|
| 2,400,248 | Morgan | May 14, 1946 |
| 2,833,493 | Pfarr | May 6, 1958 |